Aug. 29, 1950 E. J. WIESERT 2,520,587
POWER WHEEL
Filed July 16, 1948 2 Sheets-Sheet 1

Inventor
EDGAR J. WIESERT
By Cook & Robinson
Attorney

Aug. 29, 1950 E. J. WIESERT 2,520,587
POWER WHEEL
Filed July 16, 1948 2 Sheets-Sheet 2
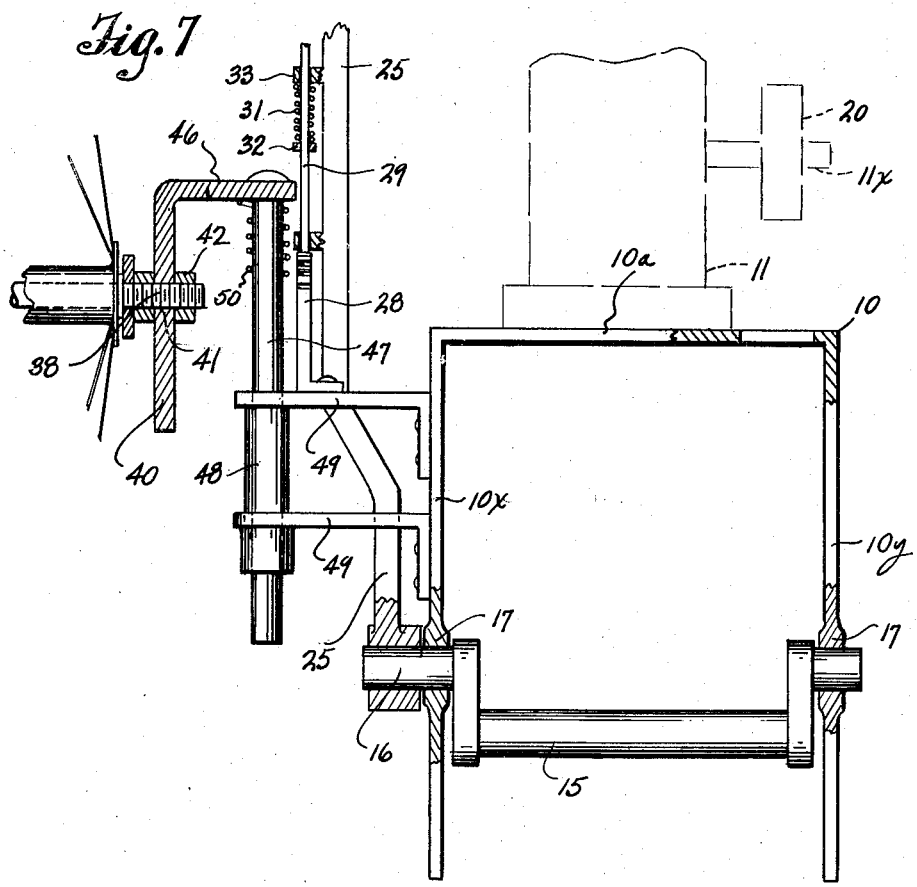
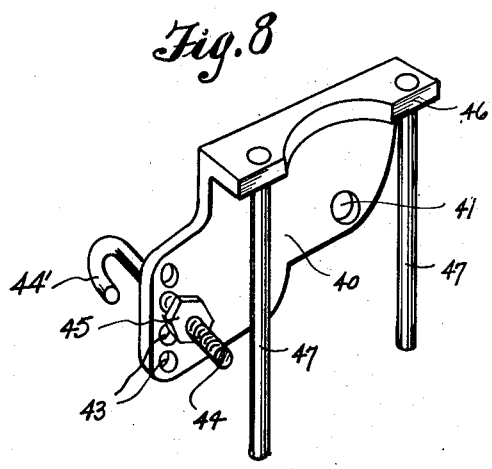
INVENTOR.
EDGAR J. WIESERT
BY
Cook & Robinson
ATTORNEYS Patented Aug. 29, 1950

2,520,587

UNITED STATES PATENT OFFICE 2,520,587

POWER WHEEL

Edgar J. Wiesert, Seattle, Wash.

Application July 16, 1948, Serial No. 39,099

4 Claims. (Cl. 180—11)

This invention relates to devices which I refer to as "power wheels." More particularly, the invention relates to an improved form of motor driven traction wheel unit that may be detachably applied to a bicycle to serve as an auxiliary propulsion means therefor.

It is the principal object of my invention to provide a compact, light-weight and serviceable propulsion unit of the above character for a bicycle, or the like; that may be easily and readily applied thereto, and which may be readily detached; and which device embodies a novel method of and means for driving the traction wheel or for allowing it to run free as in coasting or free wheeling.

It is also an object of the invention to provide novel means for mounting or attaching the present power wheel to the bicycle frame to retain the power wheel rigidly in alignment relative to the bicycle, but permitting the unit to maintain ground contact and to readily and automatically adjust itself to changes of position relative to the bicycle frame as required for travel over uneven road surfaces, and by reason of the bicycle being leaned toward one side or the other as in turning.

Another object of the invention is to provide means whereby a belt driving connection between engine and traction wheel may be readily made slack or taut by the rider of the bicycle to which the power unit is applied, thus to put the wheel in or out of gear.

Still further objects of the invention reside in the details of construction and combination of parts and their mode of use as will hereinafter be fully described.

In accomplishing these and other objects of the invention, I have provided the improved details of construction, the preferred forms of which are illustrated in the accompanying drawings, wherein:

Fig. 7 is an enlarged elevation of the unit attaching bracket and frame of the power unit; the traction wheel being omitted to better show its crank shaft mounting member.

Fig. 8 is a perspective view of the attaching bracket.

Figure 1:
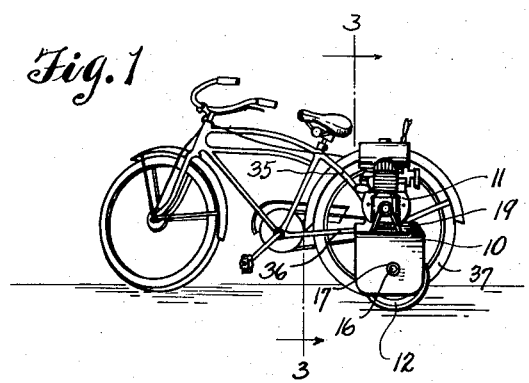
Fig. 1 is a side view of a bicycle equipped with a power wheel in accordance with the present invention and embodying the novel features of the invention therein.
Figure 2:
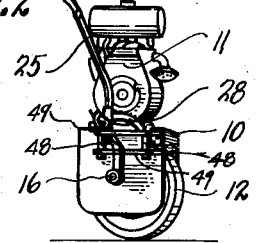
Fig. 2 is a perspective view of the power wheel unit, showing its inside elevation, that is, the side thereof that, in use of the device, is next to the bicycle.
Figure 3:
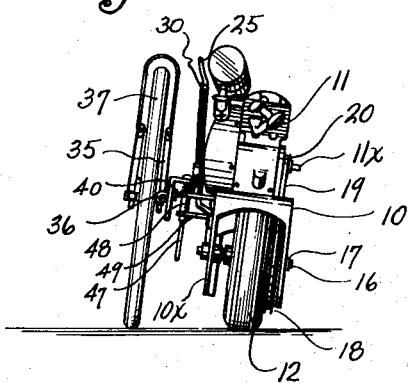
Fig. 3 is a view showing the assembled relationship of power wheel unit and bicycle; the view being taken substantially on line 3—3 in Fig. 1, and shows the relationship of power wheel unit and bicycle in making a left turn.

Referring more in detail to the drawings:

The present device comprises the power unit proper, and the attaching bracket for the functional connection of the power unit to a bicycle frame.

The power unit comprises a rigid metal frame structure that is designated in its entirety by reference numeral 10; an engine 11 that is fixedly mounted upon the frame structure; and a traction wheel 12 that is mounted in the frame 10 for travel in rolling contact with the ground and to be driven by the engine for the propulsion of the bicycle.

Figure 4:
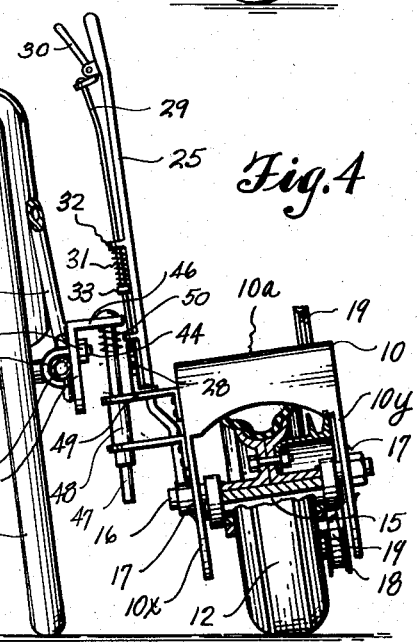
Fig. 4 is a similar, but somewhat enlarged view indicating the relationship of bicycle and power unit in making a right turn; the engine being omitted from this view and parts of the traction wheel being broken away for better showing of details.

The frame 10 comprises a flat, horizontal top plate 10a, inner and outer vertical side walls 10x and 10y integral therewith, or rigidly secured thereto, and extending downwardly therefrom for the mounting of the traction wheel 12 between them, as best shown in Fig. 4.

The wheel 12 preferably is equipped with a pneumatic tire, and has a hub portion whereby it is mounted to rotate freely on a supporting shaft 15; the shaft 15, as best shown in Fig. 7, constituting the throw of a crank shaft 16 which extends between the opposite side walls of the frame and is rotatably mounted at its ends in bearings 17—17 formed in the side walls. Fixed concentrically to the wheel hub, adjacent the outside of the wheel, is a V-belt pulley 18 about which a driving belt 19 is extended to drive the traction wheel, as presently will be explained.

The engine 11 is mounted rigidly upon the top wall of the frame 6. This may be any suitable type of engine, and is here shown to be a common type of internal combustion engine, with power shaft 11x parallel with shaft 16 and equipped at one end with a V-belt pulley 20, aligned with the belt pulley 18, to receive the belt 19 thereover. The belt 19, when drawn tightly into the grooves of the pulleys 18 and 20, will effect a driving connection between engine and traction wheel, When loosely seated in the pulleys, there will be sufficient slippage to allow the engine to coast and the traction wheel to roll free.

The means whereby the traction wheel may be adjusted in its supporting frame to cause the belt 19 to be drawn taut or to be loosely applied in the belt pulleys comprises a hand lever 25 that is fixed at its lower end to the inner end of crank shaft 16, to extend upwardly to a position at which it is easily accessible to the rider of the bicycle to which the unit is applied. The relationship of the lever 25 to the throw of the crank shaft 16 on which the traction wheel is mounted is such that by actuating the upper end of the lever forwardly, with respect to the bicycle, the crank shaft will be rotated in a manner that will move the throw of the shaft downwardly relative to the engine, thus to lower the traction wheel and incidentally draw the belt 19 taut in the pulleys and cause the traction wheel to be driven. When the lever is moved rearwardly, the crank shaft 16 is rotated in the other direction and the belt pulleys are thus moved slightly toward each other, thus to loosen the belt 19 therein and allow the traction wheel and engine to run free. The hand lever 25 may be so manipulated as to cause the belt 19 to slip or to gradually engage the pulleys, thus to avoid any sudden jerk when a driving connection is made between engine and traction wheel. Also, with power shut off, and belt taut, the engine will operate as a brake.

To retain the hand lever 25 at any set position of adjustment, I have fixed a notched segment 28 to the frame 10 and have mounted a latch rod 29 along the lever 25, for endwise shifting, with its lower end in position to be engaged in the notches. The latch rod may be retracted from an engaged position by a hand grip lever 30, pivotally fixed to its uper end and to the upper end of the lever 25. Normally the rod is urged to a locking position by a coiled spring 31 that is applied under compression between lugs 32 and 33 applied, respectively, to lever 25 and the rod.

Figure 5:
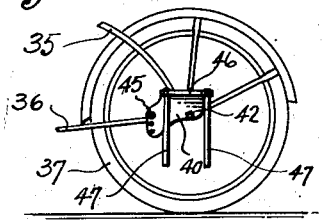
Fig. 5 is a side view of a part of a bicycle, showing the location and manner of affixing the unit attaching bracket to the bicycle frame.
Figure 6:
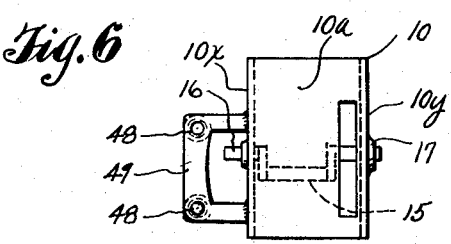
Fig. 6 is a top view of the traction unit frame.

The means for attaching the power unit to the bicycle is best shown in Figs. 4, 5 and 7, wherein 35 and 36 designate side members of the bicycle frame, 37 the rear wheel of the bicycle, and 38 the wheel mounting spindle bolt, which is secured at its ends in the bicycle frame in the usual manner.

Secured to the bicycle frame at the left side, is an attaching bracket for the unit. This comprises a flat metal plate 40, adapted to be vertically disposed along the side of a bicycle frame member 36 as in Fig. 5. At its rear end the plate has a hole 41 therein through which the adjacent end portion of spindle bolt 38 is extended and secured by a nut 42, as clearly shown in Fig. 7. In the forward end portion of the plate 40 are a series of holes 43 through any one of which a bolt 44 may be extended. This bolt has a hook 44' at its inner end adapted to be hooked over the bicycle frame member 36, and a nut 45 is threaded onto the outer end of bolt 44 to be tightened on the bolt, thus to clamp and rigidly secure the plate 40 to the bicycle frame.

Formed along the top edge of the plate 40 is an outwardly extending flange 46, and fixed rigidly therein and extending downwardly therefrom in parallel relationship, are spaced, vertical guide rods 47—47. These rods are freely slidable endwise in tubular guide bearings 48—48 that are rigidly supported by vertically spaced brackets or plates 49—49 fixed to the inside wall 10x of frame 10 as shown in Fig. 7. Coiled springs 50 are applied about the upper end portions of rods 47—47 and are fixed to the flange 46.

The relationship of parts above described is such that when assembled as shown in Figs. 1, 3, 4 and 7, the power wheel unit will be held properly in its functional relationship to the bicycle, with its wheel 12 in a plane parallel to the plane of the bicycle wheel and frame. When rounding a turn, either to the right or to the left, that results in the bicycle being leaned in the direction of the turn, the frame 10 will be leaned accordingly, but by reason of the sliding connection between rods 47—47 and the guide bearings 48—48, the traction wheel and bicycle wheel both will maintain contact with the ground and retain the functional relationship.

By manipulation of hand lever 25, the belt 19 may be caused to be loosened for idling of the engine and free wheeling of the unit, or it may be tightened to cause a driving connection to be effected.

To disconnect bicycle from power unit, it is only necessary that the bicycle be lifted to clear the rods 47—47 from the guide bearings 48—48.

It is to be understood that throttle control for the engine could be extended to the handle bar or other part of the bicycle or could be on the engine itself.

The present device is light in weight, easy to attach or detach and effectively, efficiently and satisfactorily serves its purpose.

Having thus described my invention, what I claim as new therein and desire to secure by Letters Patent is:

1. In combination, a bicycle having a frame structure, a bracket fixed rigidly to the said frame structure at the side of the rear wheel and having a plurality of vertically disposed guide rods fixed rigidly in spaced relationship therein, and a power wheel unit comprising a frame member applicable to said rods for slidable movement therealong, a traction wheel mounted in said frame member and held thereby in a plane parallel with the rear wheel of the bicycle, an engine mounted on the frame member, a belt connection between the engine shaft and power wheel shaft and a manually operable means to change the spaced relationship of the engine and power wheel to effect or discontinue driving of the wheel through the mediacy of the belt.

2. In combination, a bicycle having a frame structure and a propelling wheel, a bracket fixed rigidly to said frame structure at one side thereof and at the side of the propelling wheel, and a power wheel unit comprising a frame slidably movable in a vertical direction on said bracket, a shaft mounted in said frame and having an eccentric portion, a traction wheel mounted to revolve on said eccentric portion, parallel with the bicycle wheel, an engine mounted on said frame having a drive shaft and a belt pulley fixed thereon said traction wheel having a belt pulley thereon, a belt operable about the said pulleys of the engine shaft and traction wheel, and means for rotatably adjusting the shaft to effect a relative adjustment of the engine and shaft whereby the belt is caused to effect a driving connection or to run free.

3. A combination as in claim 2 wherein the shaft adjusting means comprises a hand lever fixed to the shaft and extended upwardly therefrom, and wherein means is mounted on said frame and on said lever for interlocking engagement to secure an adjustment of said shaft.

4. A power wheel unit applicable to a bicycle for its propulsion and comprising a frame structure, a shaft rotatably mounted in said frame structure and having an eccentric portion, a traction wheel revoluble on said eccentric portion of the shaft, an engine mounted on said frame structure, belt wheels on the traction wheel and on the engine shaft, a belt applied about said wheels to provide a driving connection, and a manual means to rotate the said shaft to change the spaced relationship of the belt wheels to effect or discontinue a driving connection through the mediacy of the belt.

EDGAR J. WIESERT.

REFERENCES CITED

The following references are of record in the file of this patent:

UNITED STATES PATENTS

| Number | Name | Date |
| --- | --- | --- |
| 1,141,539 | Greer et al. | June 1, 1915 |

FOREIGN PATENTS

| Number | Country | Date |
| --- | --- | --- |
| 19,496 | Great Britain | 1909 |
| 23,080 | Great Britain | 1908 |